United States Patent
Mayr

(10) Patent No.: US 10,516,351 B2
(45) Date of Patent: Dec. 24, 2019

(54) ELECTRICAL DRIVE FOR AN INDUSTRIAL ROBOT

(71) Applicant: KEBA AG, Linz (AT)

(72) Inventor: Franz Mayr, Alberndorf (AT)

(73) Assignee: KEBA AG (AT)

(*) Notice: Subject to any disclaimer, the term of this patent is extended or adjusted under 35 U.S.C. 154(b) by 0 days.

(21) Appl. No.: 15/775,344

(22) PCT Filed: Sep. 20, 2016

(86) PCT No.: PCT/EP2016/072287
§ 371 (c)(1),
(2) Date: May 10, 2018

(87) PCT Pub. No.: WO2017/084789
PCT Pub. Date: May 26, 2017

(65) Prior Publication Data
US 2018/0358910 A1  Dec. 13, 2018

(30) Foreign Application Priority Data

Nov. 19, 2015  (DE) .......................... 10 2015 120 023

(51) Int. Cl.
*H02P 27/08* (2006.01)
*H02P 3/22* (2006.01)
(Continued)

(52) U.S. Cl.
CPC .............. *H02P 3/22* (2013.01); *B25J 9/0009* (2013.01); *B25J 19/0004* (2013.01);
(Continued)

(58) Field of Classification Search
CPC .... H02P 3/18; H02P 3/12; H02P 27/00; H02P 3/22; H02P 3/26; H02M 5/40
See application file for complete search history.

(56) References Cited

U.S. PATENT DOCUMENTS 6,531,839 B1 * 3/2003 Shin .......................... H02P 3/04
318/362
6,573,681 B2  6/2003 Schwesig ...................... 318/801
(Continued)

FOREIGN PATENT DOCUMENTS

CN  101120504  2/2008 ............. H02M 5/40
CN  101201391  6/2008 ............. G01R 31/00
(Continued)

OTHER PUBLICATIONS

International Preliminary Report on Patentability (w/translation) issued in application No. PCT/EP2016/072287, dated Mar. 8, 2018 (11 pgs).

(Continued)

*Primary Examiner* — Rina I Duda
(74) *Attorney, Agent, or Firm* — Hayes Soloway P.C.

(57) ABSTRACT

Provided is an electrical drive for an industrial robot, wherein each driver circuit for the associated power switches of the first half-bridge is designed, in the case of a voltage-free or current-free state of the associated control input, to put the power switch associated with the control input into a non-conductive state, each driver circuit for the associated power switches of the second half-bridge is designed, in the case of a voltage-free or current-free state of the associated control input, to put the power switch associated with the control input into a conductive state, and a switching device is provided, which is designed, with the safety signal for the forced switch-off of the rotating-field voltage, to simultaneously switch the control inputs of the driver circuits for all power switches of the inverter into a voltage-free and/or current-free state.

8 Claims, 2 Drawing Sheets

(51) Int. Cl.
*B25J 19/00* (2006.01)
*H02M 7/5387* (2007.01)
*H02P 29/024* (2016.01)
*B25J 9/00* (2006.01)

(52) U.S. Cl.
CPC ........ *H02M 7/53871* (2013.01); *H02P 27/08* (2013.01); *H02P 29/0241* (2016.02)

(56) References Cited

U.S. PATENT DOCUMENTS

| | | | |
|---|---|---|---|
| 7,327,110 B2 | 2/2008 | Haul | 318/372 |
| 8,099,193 B2 * | 1/2012 | Bird-Radolovic | B25J 9/1674 318/371 |
| 8,134,315 B2 * | 3/2012 | Kamigauchi | H02P 3/22 318/375 |
| 8,593,768 B2 * | 11/2013 | Fullington | H02M 1/092 318/563 |
| 8,736,219 B2 | 5/2014 | Hofmann et al. | 318/801 |
| 8,878,468 B2 * | 11/2014 | Dooley | H02H 7/08 318/278 |
| 9,331,600 B2 * | 5/2016 | Langhans | H02M 1/32 |
| 2002/0084766 A1 | 7/2002 | Schwesig | 318/801 |
| 2006/0181239 A1 | 8/2006 | Galli et al. | 318/805 |

FOREIGN PATENT DOCUMENTS

| | | | |
|---|---|---|---|
| CN | 201299458 | 9/2009 | ............ A47J 31/00 |
| DE | 10059173 | 3/2002 | ............ H02P 3/18 |
| DE | 102005040948 | 4/2006 | ............ H02H 7/08 |
| DE | 102007059492 | 6/2009 | ............ B25J 19/06 |
| DE | 10254608 | 12/2010 | ............ H02P 3/22 |
| EP | 0742637 | 11/1996 | ............ B25J 9/18 |
| JP | 2007295751 | 11/2007 | ............ H02H 7/08 |
| WO | WO2006039963 | 4/2006 | ............ H02H 7/08 |

OTHER PUBLICATIONS

International Search Report and Written Opinion (w/translation) issued in application No. PCT/EP2016/072287, dated Dec. 21, 2016 (11 pgs).
Japanese Office Action (w/translation) issued in application No. 2018-526133, dated Mar. 5, 2019 (13 pgs).
EPO Office Action (w/translation) issued in application No. 16 770 255.4-1202, dated Jun. 11, 2019 (12 pgs).
Chinese Office Action (w/translation) issued in application No. 201680067648.8, dated Sep. 4, 2019 (18 pgs).

* cited by examiner

ELECTRICAL DRIVE FOR AN INDUSTRIAL ROBOT

BACKGROUND OF THE INVENTION

The present invention relates to an electrical drive for an industrial robot, an industrial robot comprising such an electrical drive and to a method for operating such an electrical drive for an industrial robot. Furthermore, the present invention relates to a computer program product for carrying out such a method for operating an electrical drive of an industrial robot.

BRIEF DESCRIPTION OF THE PRIOR ART

An electrical drive for an industrial robot can comprise an inverter having a first half bridge and a second half bridge for generating a rotating field voltage. Furthermore, such an electrical drive comprises control electronics for generating control signals for activating the power switches of the first and second half bridges and comprises a rotating field motor which is fed by the inverter via a motor circuit. A functional controller of the robot can provide activation signals for influencing the mode of operation of the electrical drive. Furthermore, the electrical drive can comprise an interface device for supplying a safety signal for the forced switching-off of the rotating field voltage.

For example, the document EP 0 742 637 A1 describes a method and a device for safely braking an electrical drive. In this case, the document EP 0 742 637 A1 describes that in the controller there is provided a way of producing an integrated armature short-circuit in order to effect emergency braking in the event of a fault. In order to produce the integrated armature short-circuit, one inverter bridge is blocked, while the other inverter bridge effects a short-circuit of the phases of the electrical drive by means of synchronized activation. Reaction times and braking time can be optimized by means of targeted synchronization, e.g. by means of optimum torque control via a characteristic curve.

Furthermore, the document DE 102 54 608 B4 discloses a drive system comprising integrated armature short-circuit braking, wherein the armature short-circuit is terminated in the normal case when the permissible thermal loading limits for the electric motor or its activation electronics are reached.

Moreover, the document DE 10 2007 059 492 A1 discloses an industrial robot which is designed to short-circuit the electric motor as part of an emergency braking procedure at the same time by means of two mutually independent electrical current paths.

SUMMARY OF THE INVENTION

Against this background, the object of the present invention is to improve the operation of an electrical drive of an industrial robot, in particular in terms of safety.

According to a first aspect, an electrical drive for an industrial robot is proposed, wherein the drive comprises an inverter having a first half bridge and a second half bridge for generating a rotating field voltage from a direct voltage intermediate circuit, control electronics for generating control signals for activating all of the power switches of the first half bridge and all of the power switches of the second half bridge, and a rotating field motor fed by the inverter via a motor circuit. The inverter comprises a first connection device for providing activation signals for influencing the mode of operation of the drive by means of a functional controller of the robot and an interface device for supplying at least one safety signal for the forced switching-off of the rotating field voltage by means of a safety controller of the robot. Each power switch is allocated a driver circuit having a double-pole control input galvanically separated from the motor circuit. The respective driver circuit for the power switches of the first half bridge is designed, in the case of a voltage-free or current-free state of the control input, to put the power switch, which is allocated in each case to the control input, into a non-conductive state. The respective driver circuit for the power switches of the second half bridge is designed, in the case of a voltage-free or current-free state of the control input, to put the power switch, which is allocated in each case to the control input, into a conductive state. Furthermore, the electrical drive comprises a switching device which is designed to simultaneously switch the control inputs of the driver circuits for all of the power switches of the inverter into a voltage-free and/or current-free state by means of the safety signal for the forced switching-off of the rotating field voltage.

In the case of the present electrical drive, not only does a single signal, namely the safety signal for the forced switching-off of the rotating field voltage, switch off the driving rotating field voltage at the phases (or motor connections), i.e. completely from at least one pole of the direct current intermediate circuit voltage, namely from the plus rail and/or from the minus rail of the direct voltage intermediate circuit, separately, but said signal also simultaneously short-circuits the phases, whereby the generator voltage of the rotating rotating-field motor produces a current flow in the rotating field winding of the rotating field motor which builds up a torque which counteracts the rotational movement and thus has a braking effect. This braking torque can be used to assist an additionally provided mechanical brake of the industrial robot.

It is particularly advantageous that the successful implementation of this braking state is dependent only upon the function of such components, the driver circuits for the power switches, which must function in a compulsory manner even during a functionally controlled motor-driven operation of the drive, i.e. the function of these components required for the braking state can be continuously checked without any particular testing procedures during the on-going operation, and is dependent upon the switching device which is designed preferably in a redundant manner, i.e. with multiple circuits, and in terms of safety technology and is used only for switching-off purposes.

In the event of a defect of one of these components, it is either the case that a rotating field of sufficient strength cannot be established, e.g. a power switch can no longer be switched to a conductive state or a motor winding is interrupted, or a short-circuit of the direct voltage intermediate circuit is produced, e.g. a power switch can no longer be switched off or a motor winding has a short-circuit.

Each such fault can be detected by the inverter and results in the drive being stopped directly. This continuous checking quite substantially increases the likelihood that the additional braking torque is also actually available by reason of the present motor short-circuit in an emergency situation which occurs.

In particular, the activation of the power switches is static during the entire braking state, i.e. it is not modulated, and is effected only by means of a few simple and proven elements or components, as stated above. This ensures that the motor short-circuit brake proposed in this case functions in a reliable manner.

For this reason, complex, highly integrated circuit parts and in particular synchronized microcontrollers and control circuits are also not used. This substantially improves the safety of the proposed electrical drive. In particular, the likelihood of a dangerous failure is considerably reduced in case of need (emergency situation). As a result, it also becomes permissible in particular with respect to safety technology to also take into consideration the additional braking torque, which can be achieved by the motor short-circuit compared with a solely mechanical brake, and the braking distance, which is thus reduced in the event of an emergency, during monitoring of the robot movement by means of the safety controller, thus facilitating higher movement speeds for the robot close to defined limits of the working space of the robot.

The present electrical drive can also be used for other applications or devices, in particular for machines and transport devices operated in a highly dynamic and cyclical manner. There is a particular suitability for those applications in which a compact design and low weight of the motors is important because the safe electrical braking action means that the mechanical stopping brake does not have to be over-dimensioned for the dynamic braking situation.

According to one embodiment, the safety signal is designed having two circuits, wherein the switching device is designed to simultaneously switch the control inputs of the driver circuits to a voltage-free and/or current-free state independently of both the first circuit and the second circuit.

The signal state for the safety signal is transmitted redundantly via both circuits by the safety controller. As a result, the safety signal can be transmitted technically in a particularly reliable manner from the safety controller to the inverter. Therefore, it is possible for the drive to be stopped even when there is one individual fault in one of the two circuits.

According to a further embodiment, the driver circuit comprises an optocoupler.

According to a further embodiment, the interface device has a first interface and a second interface for receiving a first safety signal and a second safety signal, which is redundant with respect to the first safety signal, from the safety controller of the robot, wherein by means of the first safety signal a first switch of the switching device is actuated for disconnecting the diodes of the optocouplers from earth and wherein by means of the second safety signal a second switch of the switching device is actuated for disconnecting the control electronics for driving the optocouplers from the supply voltage.

As a result, the two circuits of the safety signal can switch the control inputs of the driver circuits to a voltage-free state or current-free state via mechanisms, which are different in terms of circuitry, or different engagement points.

This once again increases the reliability by reason of the diverse circuitry design. A cause of a fault which would render one of the engagement points ineffective, e.g. a short-circuit at a specific location, does not have the same effect upon the other engagement point because this engagement point is configured with different circuitry. As a consequence, the likelihood of successful switching-off via the further engagement point is increased.

According to a further embodiment, the switching device is designed, in the case of a current-free or voltage-free state of the safety signal with respect to a fixed reference potential, to simultaneously switch the control inputs of the driver circuits of all of the power switches to a voltage-free and/or current-free state.

This is advantageous because, if there is an open circuit between the safety controller and the inverter, the drive is automatically stopped as a consequence and a safe state is thus automatically established.

According to a further embodiment, the rotating field motor fed by the inverter is a permanently excited synchronous motor.

The permanently excited synchronous motor is particularly suitable for robot drives because it is robust, reliable and can also be highly overloaded for short periods of time so that during the braking procedure in the event of an emergency a high braking torque is available in a reliable manner and without damaging the synchronous motor.

According to a further embodiment, the electrical drive comprises an electronically accessible data memory which is structurally coupled to the rotating field motor.

To this end, the control electronics of the inverter are designed to read-out the data memory as soon as the rotating field motor is connected ready for operation to the inverter, wherein the control electronics of the inverter are designed to derive the suitability of the rotating field motor in combination with the inverter for damage-free short-circuit braking from information stored in the data memory.

Alternatively or in addition, the safety controller is designed to read-out the data memory as soon as the rotating field motor is connected ready for operation to the inverter, wherein the safety controller is designed to derive the suitability of the rotating field motor in combination with the inverter for damage-free short-circuit braking from information stored in the data memory.

Alternatively or in addition, the functional controller is designed to read-out the data memory as soon as the rotating field motor is connected ready for operation to the inverter, wherein the functional controller is designed to derive the suitability of the rotating field motor in combination with the inverter for damage-free short-circuit braking from information stored in the data memory.

This advantageously provides the option of automatically checking the basic suitability of a rotating field motor, which is connected to the inverter, in combination with the respective inverter. Short-circuit braking from a high rotational speed represents both for the inverter and a rotating field motor an albeit short-time but extraordinarily high electrical, thermal, mechanical and magnetic loading. It is only when the inverter and rotating field motor are suitably adapted to one another that such a loading state is withstood without any damage and it is ensured that the braking torque of the motor can also be reliably provided. Since the motor of an electrical drive could also be replaced by another motor, which is not suitable for short-circuit braking, even after the initial operation of a robot, for instance during maintenance work or modifications, the automatic checking of the suitability and enabling of the robot movement associated with a positive checking result reliably prevents damage to the drive and a loss of safety.

According to a further embodiment, the electrical drive comprises a rotation angle sender, which is structurally coupled to the rotating field motor, for detecting, by means of sensors, the absolute and/or relative angle change of a motor shaft of the rotating field motor. The rotation angle sender is coupled via a communications connection to the control electronics of the inverter and/or to the safety controller and/or to the functional controller for determining an actual position of a motor axle of the rotating field motor and/or a robot axle of the robot. The electronically accessible data memory is combined with the rotation angle sender structurally and in terms of signal technology.

This provides a particularly advantageous embodiment, in which the cabling required in any case for the signal-technology coupling of a rotation angle sender, which is structurally coupled to the rotating field motor, to the controller system is also used identically for reading-out the data memory which is integrated in the rotation angle sender and includes motor information and therefore additional cabling outlay is superfluous.

According to a second aspect, an industrial robot comprising an electrical drive according to the first aspect or according to one of the embodiments of the first aspect is proposed.

According to a third aspect, a method for operating an electrical drive for an industrial robot, in particular a drive according to the first aspect, is proposed. The drive comprises an inverter having a first half bridge and a second half bridge for generating a rotating field voltage from a direct voltage intermediate circuit, control electronics for generating control signals for activating all of the power switches of the first half bridge and all of the power switches of the second half bridge, and a rotating field motor fed by the inverter via a motor circuit. The inverter comprises a first connection device for providing activation signals for influencing the mode of operation of the drive by means of a functional controller of the robot and an interface device for supplying at least one safety signal for the forced switching-off of the rotating field voltage by means of a safety controller of the robot. Each power switch is allocated a driver circuit having a double-pole control input galvanically separated from the motor circuit.

In the method, in the case of a voltage-free or current-free state of the control input the respective driver circuit for the power switches of the first half bridge puts the power switch, which is allocated in each case to the control input, into a non-conductive state.

Furthermore, in the case of a voltage-free or current-free state of the control input the respective driver circuit for the power switches of the second half bridge puts the power switch, which is allocated in each case to the control input, into a conductive state.

Furthermore, the control inputs of the driver circuits for all of the power switches of the inverter are simultaneously switched into a voltage-free and/or current-free state by the safety signal for the forced switching-off of the rotating field voltage.

According to one embodiment, the electrical drive has a mechanical brake for applying a braking torque to the motor shaft of the rotating field motor, wherein the mechanical brake is activated at the same time as the safety signal is engaged for safe stopping.

According to a further embodiment, the safety controller monitors the movement of the robot in terms of defined limits for positions, speeds and/or accelerations taking into consideration a maximum braking distance which is dependent upon the speed. In the event that a maximum permissible speed determined for the respective movement state of the robot is exceeded or in the event that a minimum distance with respect to a position limit to be maintained for a current speed is not achieved, the safety signal is engaged, wherein the sum of the guaranteed braking torque applied by the mechanical brake and the guaranteed braking torque applied by the short-circuited rotating field motor is taken into consideration when determining or checking the maximum braking distance which is dependent upon the speed.

This permits a higher travel speed of the robot close to position limits monitored by the safety controller, which results in shorter cycle times and improved productivity.

According to a further embodiment, the suitability of a specific type of rotating field motor in combination with a specific type of inverter for performing short-circuit braking without any damage under established operating conditions is checked in an experimental environment. For this purpose, information is stored in a data memory which is structurally coupled to a rotating field motor of a successfully tested type and can be read-out electronically, wherein the suitability and preferably the established operating conditions can be derived from the stored information so that during operation with a robot the information is read-out from the data memory by the control electronics of the inverter and/or by the safety controller and/or by the functional controller and is matched with the type of inverter used, wherein the movement of the robot is prevented until a positive checking result is established.

This improves the safety of the robot, in that even when subsequent modifications and maintenance work is performed on the drive or the drives of the robot it is ensured that only those motor types can be operated together in combination with a specific type of inverter, in which suitability for performing short-circuit braking without any damage has been checked and confirmed by the manufacturer or an independent certification authority.

The embodiments and features described for the proposed electrical drive apply accordingly to the proposed method.

According to a fourth aspect, a computer program product is proposed which, on a program-controlled device, causes the method explained above according to the second aspect to be carried out.

A computer program product, such as e.g. a computer program means, can be provided or supplied e.g. as a storage medium, such as e.g. a memory card, USB stick, CD ROM, DVD or even in the form of a downloadable file from a server in a network. This can be effected e.g. in a wireless communications network by the transmission of a corresponding file with the computer program product or the computer program means.

Further possible implementations of the invention also include non-explicitly-mentioned combinations of features or embodiments which have been described or will be described hereinafter in relation to the exemplified embodiments. In this regard, a person skilled in the art will also add individual aspects as improvements or complements to the respective basic form of the invention.

BRIEF DESCRIPTION OF THE DRAWINGS

The invention will be explained hereinafter in more detail with the aid of preferred embodiments with reference to the accompanying figures.

In the figures, like elements or elements functioning in an identical manner are provided with the same reference signs, unless otherwise indicated.

DETAILED DESCRIPTION OF THE INVENTION

Figure 1:
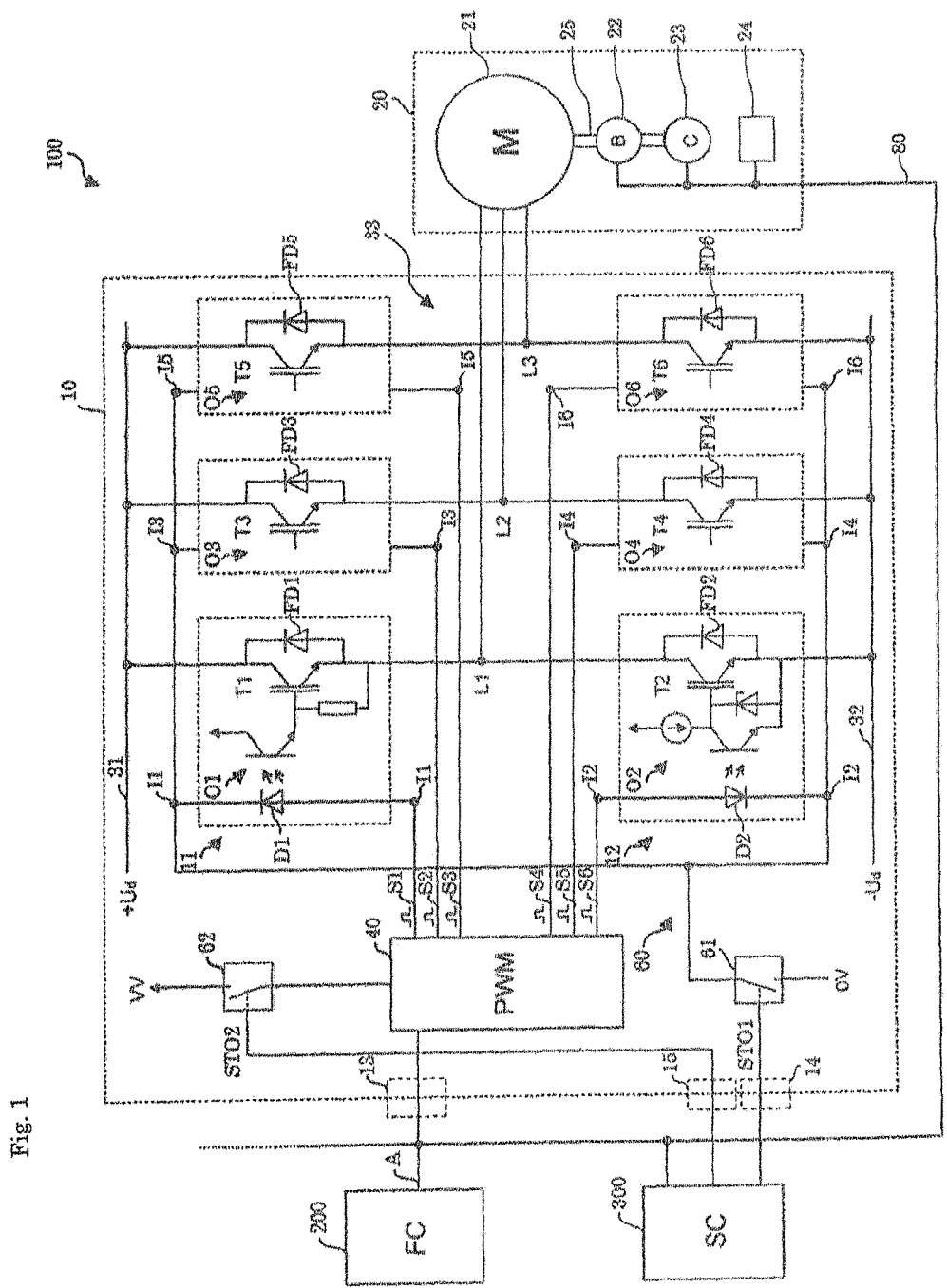
FIG. 1 shows a circuit diagram of an exemplified embodiment of an electrical drive for an industrial robot.

FIG. 1 illustrates a circuit diagram of an exemplified embodiment of an electrical drive 100 for an industrial robot.

The electrical drive 100 of FIG. 1 comprises an inverter 10 which has a first half bridge 11 and a second half bridge 12 for generating a rotating field voltage from a direct voltage intermediate circuit. The first half bridge 11 comprises three power switches T1, T3, T5. The second half bridge 12 likewise comprises three power switches T2, T4, T6.

The first half bridge 11 is connected to a plus rail 31 of the direct voltage intermediate circuit. The second half bridge 12 is connected to a minus rail 32 of the direct voltage intermediate circuit. Furthermore, the respective power switch T1 T6 comprises a respective free-wheeling diode FD1-FD6.

Furthermore, the drive 100 comprises control electronics 40, e.g. a PWM controller (PWM: pulse-width modulation). The control electronics 40 are designed to generate control signals S1-S6 for activating all of the power switches T1, T3, T5 of the first half bridge 11 and all of the power switches T2, T4, T6 of the second half bridge 12.

Furthermore, the electrical drive 100 comprises a rotating field motor 21 which is fed by the inverter 10 via a motor circuit 33.

In particular, the rotating field motor 21 is part of an assembly 20. Furthermore, the assembly 20 comprises a motor shaft 25 which is coupled to the rotating field motor 21 and on which a brake 22 and a rotation angle sender 23 are provided. Furthermore, the assembly 20 comprises a data memory 24 which is configured e.g. as a ROM memory or as an EEPROM memory. For example, the rotating field motor 21 is a permanently excited synchronous motor.

Furthermore, the inverter 10 comprises a first connection device 13 for providing activation signals A for influencing the mode of operation of the drive 100 by means of a functional controller 200 of the robot.

Furthermore, the inverter 10 comprises at least one interface device 14, 15 for supplying at least one safety signal STO1, STO2 for the forced switching-off of the rotating field voltage by means of a safety controller 300 of the robot.

In other words, the inverter 10 is coupled to the safety controller 300 of the robot by means of the at least one interface device 14, 15.

Each power switch T1-T6 of the inverter 10 is allocated a driver circuit O1-O6 having a double-pole control input I1-I6 galvanically separated from the motor circuit 33. For example, the driver circuit O1 is allocated to the power switch T1 and has the control input I1. For reasons of clarity, FIG. 1 illustrates only the driver circuits O1 and O2 in detail. The further driver circuits O3-O6 are indicated by their reference signs.

In the example of FIG. 1, the respective driver circuit is configured as an optocoupler O1-O6.

The respective optocoupler O1, O3, O5 for the power switches T1, T3, T5 of the first half bridge 11 is designed, in the case of a voltage-free or current-free state of the control input I1, I3, I5, to put the power switch T1, T3, T5, which is allocated in each case to the control input I1, I3, I5, into a non-conductive state. For example, the optocoupler O1 for the power switch T1 of the first half bridge 11 is designed, in the case of a voltage-free or current-free state of the control input I1, to put the power switch T1, which is allocated in each case to the control input I1, into the non-conductive state.

Moreover, the respective optocoupler O2, O4, O6 for the power switches T2, T4, T6 of the second half bridge 12 is designed, in the case of a voltage-free or current-free state of the control input I2, I4, I6, to put the power switch T2, T4, T6, which is allocated in each case to the control input I2, I4, I6, into a conductive state.

Furthermore, the electrical drive 100 comprises a switching device 60. The switching device 60 can comprise a plurality of switches 61, 62. The switching device 60 is designed to simultaneously switch the control inputs I1-I6 of optocouplers O1-O6 for all of the power switches T1-T6 of the inverter 10 into a voltage-free and/or current-free state by means of the safety signal STO1, STO2 for the forced switching-off of the rotating field voltage.

In particular, the safety signal STO1, STO2—as shown in FIG. 1—is designed having two circuits. The switching device 60 is designed to simultaneously switch the control inputs I1-I6 of the optocouplers O1-O6 to a voltage-free and/or current-free state independently of both the first circuit STO1 and the second circuit STO2.

The interface device 14, 15 preferably comprises a first interface 14 and a second interface 15 for receiving a first safety signal STO1 and a second safety signal STO2, which is redundant with respect to the first safety signal STO1, from the safety controller 300 of the robot. A first switch 61 of the switching device 60 for disconnecting the diodes D1-D6 of the optocouplers O1-O6 from earth 0V is actuated by means of the first safety signal STO1. As already mentioned above, the optocouplers O3-O6 and thus the diodes D3-D6 are only indicated in FIG. 1. A second switch 62 of the switching device 60 for disconnecting the control electronics 40 for driving the optocouplers O1-O6 from the supply voltage VV is actuated by means of the second safety signal STO2.

In particular, the switching device 60 is designed, in the case of a current-free or voltage-free state of the safety signal STO1, STO2 with respect to a fixed reference potential, to simultaneously switch the control inputs I1-I6 of the optocouplers O1-O6 of all of the power switches T1-T6 to a voltage-free and/or current-free state.

As already stated above, the electrical drive 100 also comprises a data memory 24 which is structurally coupled to the rotating field motor 21 in the assembly 20 and furthermore is electronically accessible. The data memory 24 can be electronically accessed e.g. by means of the control electronics 40 of the inverter 10, by means of the safety controller 300 and/or by means of the functional controller 200. For this purpose, a communications connection 80 is provided. The dotted end of the communications connection 80 in FIG. 1 illustrates that further units, e.g. control units, can also be connected to the communications connection 80. The communications connection 80 is e.g. a bus.

The control electronics 40 and/or the safety controller 300 and/or the functional controller 200 are designed to read-out the data memory 24 via the communications connection 80 as soon as the rotating field motor 21 is connected ready for operation to the inverter 10. Furthermore, the control electronics 40 and/or the safety controller 300 and/or the functional controller 200 are designed to derive the suitability of the rotating field motor 21 in combination with the inverter 10 for damage-free short-circuit braking from information stored in the data memory 24.

Furthermore, as already stated above, a rotation angle sender 23 is arranged in the assembly 20. The rotation angle sender 23 is coupled to the rotating field motor 21. The rotation angle sender 23 is designed to detect, by means of sensors, an absolute and/or a relative angle change of the motor shaft 25 of the rotating field motor 21. The rotation angle sender 23 can be coupled via the communications connection 80 to the control electronics 40 of the inverter 10 and/or to the safety controller 300 and/or to the functional controller 200 for determining an actual position of a motor shaft of the rotating field motor 21 and/or a robot shaft of the robot.

Figure 2:
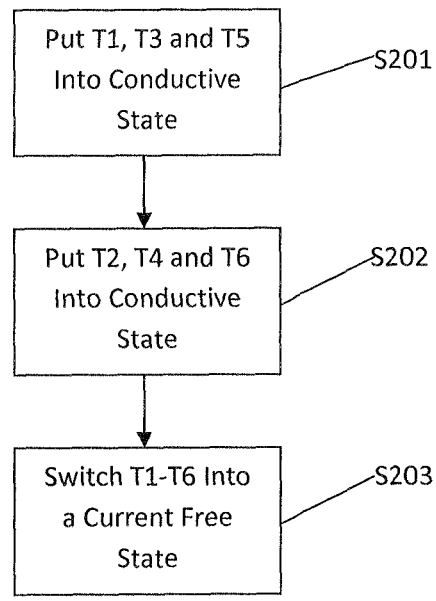
FIG. 2 shows a schematic flow diagram of a first exemplified embodiment of a method for operating an electrical drive for an industrial robot.

FIG. 2 illustrates a schematic flow diagram of a first exemplified embodiment of a method for operating an electrical drive 100 for an industrial robot. An example of such an electrical drive 100 is illustrated in FIG. 1.

The exemplary method of FIG. 2 comprises the following steps S201, S202 and S203:

In step S201, the respective driver circuit O1, O3, O5 for the power switches T1, T3, T5 of the first half bridge 11, in the case of a voltage-free or current-free state of the control input I1, I3, I5, puts the power switch T1, T3, T5 which is allocated in each case to the control input I1, I3, I5, into a conductive state.

In step S202, the respective driver circuit O2, O4, O6 for the power switches T2, T4, T6 of the second half bridge 12, in the case of a voltage-free or current-free state of the control input I2, I4, I6, puts the power switch T2, T4, T6, which is allocated in each case to the control input I2, I4, I6, into a conductive state.

In step S203, the control inputs I1-I6 of the driver circuits O1-O6 for all of the power switches T1-T6 of the inverter 10 are simultaneously switched into a voltage-free and/or current-free state by means of the safety signal STO1, STO2 for the forced switching-off of the rotating field voltage.

The sequence of steps S201, S202 and S203 illustrated in FIG. 2 is provided only by way of example and in particular does not represent a time sequence. In particular, the step S203 can be performed as the first step.

As illustrated in FIG. 1, the electrical drive 100 can have a mechanical brake 22 for applying a braking torque to the motor shaft 25 of the rotating field motor 21. In particular, the mechanical brake 22 can be activated at the same time as the safety signal STO1, STO2 is engaged for safe stopping.

Furthermore, the safety controller 300 monitors preferably the movement of the robot in terms of defined limits for positions, speeds and/or accelerations taking into consideration a maximum braking distance which is dependent upon the speed. In the event that a maximum permissible speed determined for the respective braking state of the robot is exceeded or in the event that a minimum distance with respect to a position limit to be maintained for a current speed is not achieved, the safety signal STO1, STO2 is engaged. Preferably, the sum of the guaranteed braking torque applied by the mechanical brake 22 and the guaranteed braking torque applied by the short-circuited rotating field motor 21 is taken into consideration when determining or checking the maximum braking distance which is dependent upon the speed.

Figure 3:
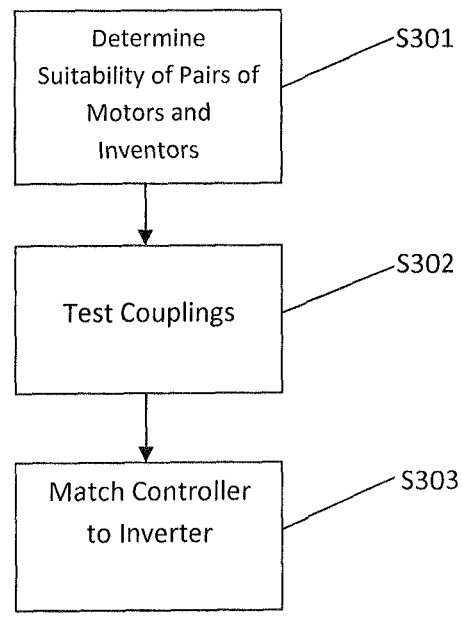
FIG. 3 shows a schematic flow diagram of a second exemplified embodiment of a method for operating an electrical drive for an industrial robot.

FIG. 3 shows a schematic flow diagram of a second exemplified embodiment of a method for operating an electrical drive 100 for an industrial robot. An example of such an electrical drive 100 is illustrated in FIG. 1.

The exemplary method of FIG. 3 comprises the following steps S301, S302 and S303: In step S301, the suitability of a specific type of rotating field motor 21 in combination with a specific type of inverter 10 for performing short-circuit braking without any damage under established operating conditions is checked in an experimental environment. In particular, a plurality of types of rotating field motors with a plurality of types of inverters is checked and permissible pairs of one type of rotating field motor and one type of inverter are determined.

In step S302, information is stored for this purpose in a data memory 24 which can be structurally coupled to a rotating field motor 21 of a successfully tested type and can be read-out electronically.

In step S303, the suitability and preferably the established operating conditions are derived from the stored information so that during operation with a robot the information is read-out from the data memory 23 by the control electronics 40 of the inverter 10 and/or by the safety controller 300 of the robot and/or by the functional controller 200 of the robot and is matched with the type of inverter 10 used, wherein the movement of the robot is prevented until a positive checking result is established.

Although the present invention has been described with reference to exemplified embodiments, it can be modified in many ways.

LIST OF REFERENCE SIGNS 0V earth
10 inverter
11 first half bridge
12 second half bridge
13 connection device
14 first interface
15 second interface
20 assembly
21 rotating field motor
22 brake
23 rotation angle sender
24 data memory
25 motor shaft
31 plus rail
32 minus rail
33 motor circuit
40 control electronics
60 switching device
61 first switch
62 second switch
80 communications connection
100 electrical drive
200 functional controller
300 safety controller
A activation signal
D1 diode
D2 diode
D3 diode
D4 diode
D5 diode
D6 diode
FD1 free-wheeling diode
FD2 free-wheeling diode
FD3 free-wheeling diode
FD4 free-wheeling diode
FD5 free-wheeling diode
FD6 free-wheeling diode
I1 double-pole control input
I2 double-pole control input
I3 double-pole control input
I4 double-pole control input
I5 double-pole control input
I6 double-pole control input
L1 phase
L2 phase
L3 phase
O1 optocoupler
O2 optocoupler O3 optocoupler
O4 optocoupler
O5 optocoupler
O6 optocoupler
S1 control signal
S2 control signal
S3 control signal
S4 control signal
S5 control signal
S6 control signal
STO1 safety signal
STO2 safety signal
T1 power switch
T2 power switch
T3 power switch
T4 power switch
T5 power switch
T6 power switch
VV supply voltage

The invention claimed is:

1. An electrical drive for an industrial robot, wherein the drive comprises an inverter having a first half bridge and a second half bridge for generating a rotating field voltage from a direct voltage intermediate circuit, control electronics for generating control signals for activating all power switches of the first half bridge and all power switches of the second half bridge, and a rotating field motor fed by the inverter via a motor circuit, wherein the inverter comprises a first connection device for providing activation signals for influencing a mode of operation of the drive by a functional controller of the robot and an interface device for supplying at least one safety signal for forced switching-off of the rotating field voltage by a safety controller of the robot, wherein each power switch is allocated a driver circuit having a double-pole control input galvanically separated from the motor circuit, wherein a respective driver circuit for the power switches of the first half bridge is designed, in the case of a voltage-free or current-free state of the control input, to put the power switch, which is allocated in each case to the control input, into a non-conductive state, a respective driver circuit for the power switches of the second half bridge is designed, in the case of a voltage-free or current-free state of the control input, to put the power switch, which is allocated in each case to the control input, into a conductive state, and a switching device is provided which is designed to simultaneously switch the control inputs of the driver circuits for all of the power switches of the inverter into a voltage-free and/or current-free state by the safety signal for the forced switching-off of the rotating field voltage.

2. The electrical drive as claimed in claim 1, wherein
the safety signal is designed having two circuits, wherein the switching device is designed to simultaneously switch the control inputs of the driver circuits to a voltage-free and/or current-free state independently of both the first circuit and the second circuit.

3. The electrical drive as claimed in claim 1, wherein
the driver circuit comprises an optocoupler.

4. The electrical drive as claimed in claim 3, wherein
the interface device has a first interface and a second interface for receiving a first safety signal and a second safety signal, which is redundant with respect to the first safety signal, from the safety controller of the robot, wherein a first switch of the switching device is actuated by the first safety signal for disconnecting the diodes of the optocouplers from earth and Wherein a second switch of the switching device is actuated by the second safety signal for disconnecting the control electronics for driving the optocouplers from the supply voltage.

5. The electrical drive as claimed in claim 1, wherein
the switching device is designed, in the case of a current-free or voltage-free state of the safety signal with respect to a fixed reference potential, to simultaneously switch the control inputs of the driver circuits of all of the power switches to a voltage-free and/or current-free state.

6. The electrical drive as claimed in claim 1, wherein
the rotating field motor fed by the inverter is a permanently excited synchronous motor.

7. The electrical drive as claimed in claim 1, wherein
an electronically accessible data memory is provided which is structurally coupled to the rotating field motor, wherein the control electronics of the inverter and/or the safety controller and/or the functional controller is designed to read-out the data memory as soon as the rotating field motor is connected ready for operation to the inverter, wherein the control electronics of the inverter and/or the safety controller and/or the functional controller is designed to derive the suitability of the rotating field motor in combination with the inverter for damage-free short-circuit braking from information stored in the data memory.

8. The electrical drive as claimed in claim 1, wherein
a rotation angle sender which is structurally coupled to the rotating field motor is provided, for detecting, by sensors, the absolute and/or relative angle change of a motor shaft of the rotating field motor, which is coupled via a communications connection to the control electronics of the inverter and/or the safety controller and/or to the functional controller for determining an actual position of a motor axle of the rotating field motor and/or a robot axle of the robot, wherein the electronically accessible data memory is combined with the rotation angle sender structurally and in terms of signal technology.

* * * * *